United States Patent
Eremenko et al.

(10) Patent No.: US 9,838,516 B2
(45) Date of Patent: *Dec. 5, 2017

(54) SYSTEMS AND METHODS FOR TANGIBLE CONFIGURATION OF A MODULAR MOBILE ELECTRONIC DEVICE

(71) Applicant: Google Inc., Mountain View, CA (US)

(72) Inventors: Paul Eremenko, Mountain View, CA (US); David Fishman, Mountain View, CA (US); Jason Chua, Mountain View, CA (US); Andrew Viny, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,208

(22) Filed: Feb. 27, 2017

(65) Prior Publication Data

US 2017/0171370 A1     Jun. 15, 2017

Related U.S. Application Data

(63) Continuation of application No. 14/834,258, filed on Aug. 24, 2015, now Pat. No. 9,614,942.

(60) Provisional application No. 62/040,882, filed on Aug. 22, 2014.

(51) Int. Cl.
*H04M 1/02* (2006.01)
*H04B 5/00* (2006.01)
*H04W 8/24* (2009.01)

(52) U.S. Cl.
CPC ........ *H04M 1/0254* (2013.01); *H04B 5/0062* (2013.01); *H04M 1/0249* (2013.01); *H04M 1/0262* (2013.01); *H04M 1/0264* (2013.01); *H04M 1/0266* (2013.01); *H04W 8/24* (2013.01)

(58) Field of Classification Search
CPC ................. H04M 1/0249; H04M 1/72569
USPC ........ 455/418, 575.1, 453, 551, 556.1, 90.2, 455/90.3
See application file for complete search history.

(56) References Cited

U.S. PATENT DOCUMENTS

| | | | |
|---|---|---|---|
| 4,658,333 A | 4/1987 | Grimes | |
| 4,856,088 A | 8/1989 | Oliwa et al. | |
| 4,904,549 A | 2/1990 | Goodwin et al. | |
| 4,974,317 A | 12/1990 | Rodriguez, II et al. | |
| 5,895,230 A | 4/1999 | Bartley | |
| 5,983,303 A | 11/1999 | Sheafor et al. | |
| 6,672,963 B1 * | 1/2004 | Link | A63F 13/10 463/43 |
| 6,862,173 B1 | 3/2005 | Konshak et al. | |

(Continued)

FOREIGN PATENT DOCUMENTS

WO     WO 2013120723     8/2013

OTHER PUBLICATIONS

Phonebloks, Sep. 10, 2013, https://www.youtube.com/watch?v=oDAw7vW7H0c&feature=youtu.be.

*Primary Examiner* — John J Lee
(74) *Attorney, Agent, or Firm* — Dority & Manning, P.A.

(57) ABSTRACT

A system for tangible configuration of a modular mobile electronic device includes a set of emulator modules, each comprising a processor and configurable to represent any of a set of full modules available for use with the modular mobile electronic device a chassis that mechanically couples to at least one of the set of emulator modules, and a module configurator that associates each of the set of emulator modules with an emulation profile.

20 Claims, 9 Drawing Sheets

(56) References Cited

U.S. PATENT DOCUMENTS

| | | |
|---|---|---|
| 7,458,815 B2 | 12/2008 | Fallah-Adl et al. |
| 7,509,094 B2 | 3/2009 | Moran et al. |
| 7,618,260 B2 | 11/2009 | Daniel et al. |
| 8,154,244 B1 | 4/2012 | Gorham et al. |
| 8,180,395 B2 | 5/2012 | Moran et al. |
| 8,249,656 B2 | 8/2012 | Sherman et al. |
| 8,285,342 B2 | 10/2012 | Moran et al. |
| 8,509,848 B1 | 8/2013 | Cole |
| 2003/0118006 A1 | 6/2003 | Yang et al. |
| 2004/0157664 A1* | 8/2004 | Link ............... A63F 13/10 463/43 |
| 2004/0212941 A1 | 10/2004 | Haas et al. |
| 2005/0190124 A1 | 9/2005 | Manabe |
| 2007/0099593 A1 | 5/2007 | Thome et al. |
| 2008/0028237 A1 | 1/2008 | Knight |
| 2008/0168282 A1 | 7/2008 | Brundridge |
| 2008/0197825 A1 | 8/2008 | Siri |
| 2008/0224769 A1 | 9/2008 | Markowski et al. |
| 2009/0124288 A1 | 5/2009 | Song et al. |
| 2009/0167245 A1 | 7/2009 | Nguyen |
| 2009/0280865 A1 | 11/2009 | Danis et al. |
| 2010/0073202 A1 | 3/2010 | Mazed |
| 2010/0220432 A1 | 9/2010 | Wise et al. |
| 2010/0302028 A1 | 12/2010 | Desai et al. |
| 2010/0323238 A1 | 12/2010 | Takahashi et al. |
| 2011/0157815 A1 | 6/2011 | Lin |
| 2011/0179405 A1 | 7/2011 | Dicks et al. |
| 2011/0264944 A1 | 10/2011 | Newman |
| 2012/0293934 A1 | 11/2012 | Boduch et al. |
| 2013/0008707 A1 | 1/2013 | Kim |
| 2013/0026572 A1 | 1/2013 | Kawa et al. |
| 2013/0103212 A1 | 4/2013 | Andiappan |
| 2013/0155600 A1 | 6/2013 | Ross et al. |
| 2014/0009980 A1 | 1/2014 | Divan et al. |
| 2015/0004956 A1* | 1/2015 | Aksamit ............... H04W 4/025 455/418 |

* cited by examiner modular mobile
electronic device,
slots partially filled modular mobile
electronic device,
slots filled

SYSTEMS AND METHODS FOR TANGIBLE CONFIGURATION OF A MODULAR MOBILE ELECTRONIC DEVICE

PRIORITY CLAIM

The present application is a continuation of U.S. application Ser. No. 14/834,258 having a filing date of Aug. 24, 2015, which is based upon U.S. Provisional Application No. 62/040,882, filed on 22 Aug. 2014, all of which is incorporated in its entirety by this reference.

TECHNICAL FIELD

This invention relates generally to the mobile electronics field, and more specifically to new and useful systems and methods for tangible configuration of a modular mobile electronic device in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Modular mobile electronic devices may serve to meet user needs and preferences by allowing for a wide range of user customization options. The wide range of user customization options available empowers users to configure truly personalized modular mobile electronic device, but it may also be overwhelming, especially to users less familiar with modular mobile electronic devices. Thus, there is a need in mobile electronics field to create systems and methods for tangible configuration of a modular mobile electronic device. This invention provides such new and useful systems and methods.

DESCRIPTION OF THE INVENTION EMBODIMENTS

The following description of the embodiments of the invention is not intended to limit the invention to these embodiments, but rather to enable any person skilled in the art to make and use this invention.

Figure 1:
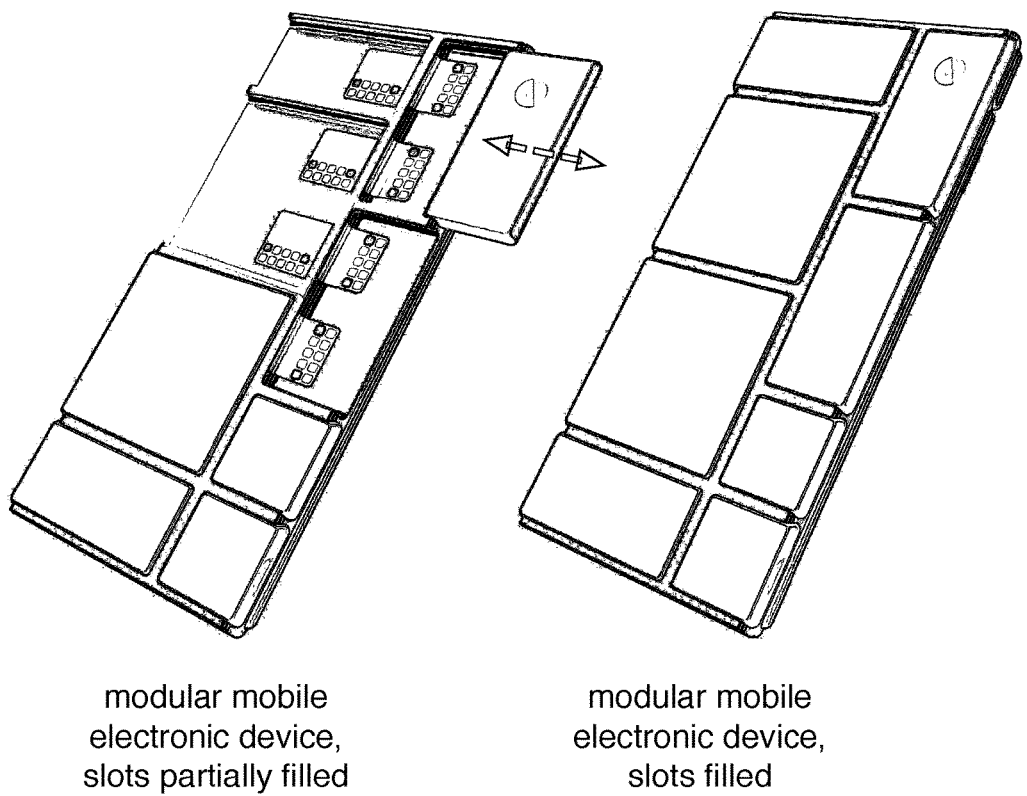
FIG. 1 is a model view of a modular mobile electronic device.
Figure 2A:
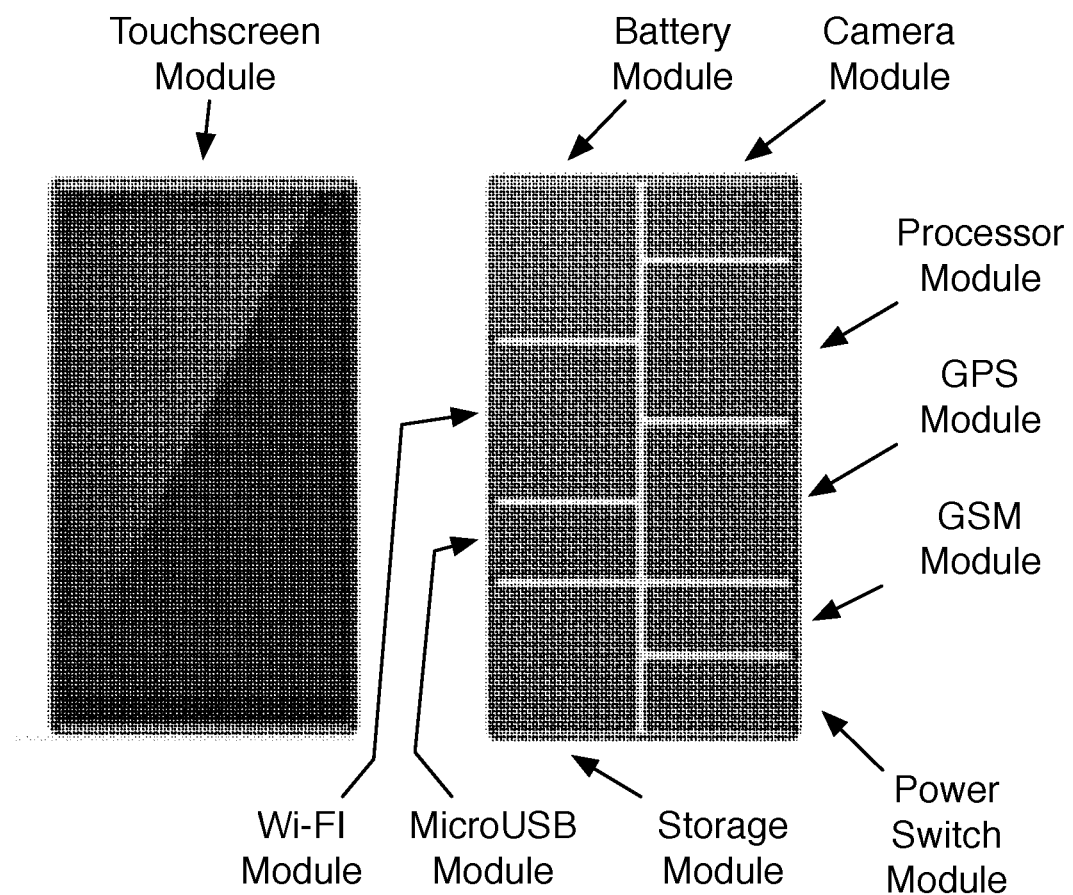
FIGS. 2A and 2B are image views of modular mobile electronic devices.

As shown in FIG. 1, modular mobile electronic devices are preferably created and/or modified through the use of user-removable modules. When multiple modules are connected, the modules are preferably enabled, in confederation, to serve as a mobile electronic device. The mobile electronic device created by such a confederation is preferably characterized by the confederated modules as well as the parameters of confederation, which are preferably determined by the confederated modules and any system enabling the confederation of the modules. As shown in FIG. 2A, a modular mobile electronic device configured to serve as a smartphone is an example of a possible mobile electronic device. Other examples of possible mobile electronic devices include those configured to serve as tablets, laptops, media players, cameras, measurement devices, gaming systems, vehicular computing devices, set-top boxes, and televisions.

Figure 2B:
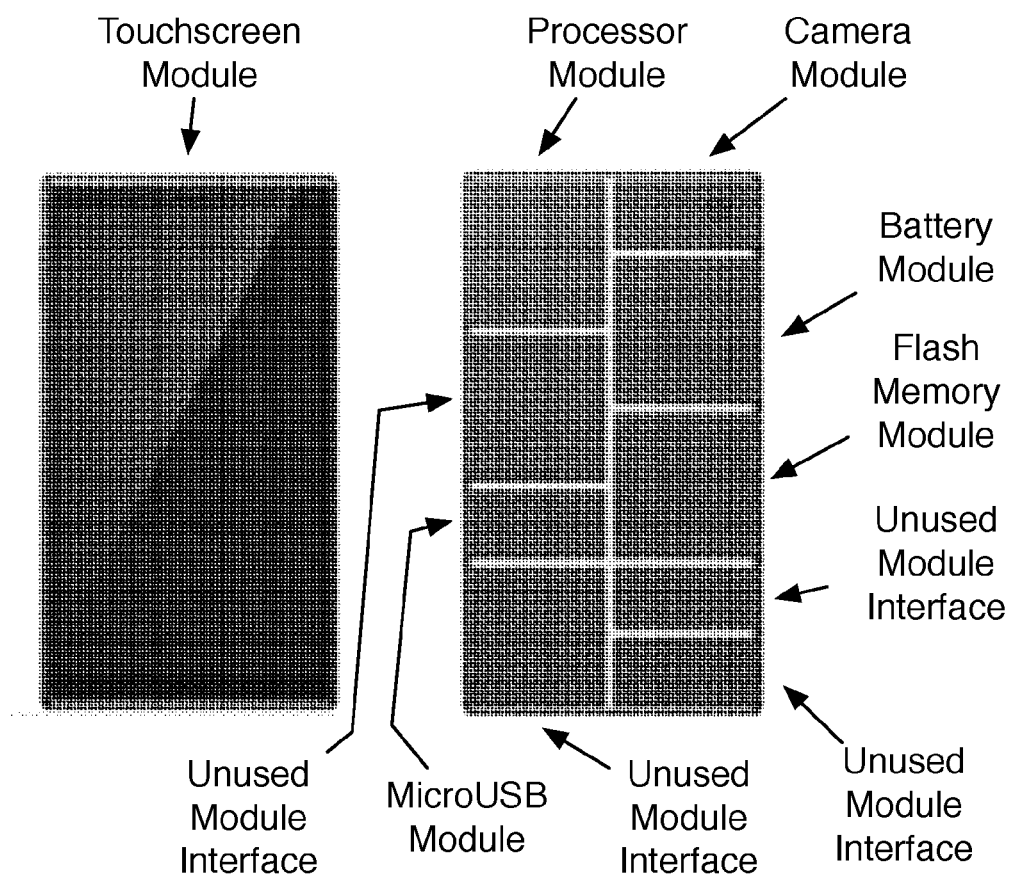

Modules are preferably user-removable and replaceable, enabling users to create mobile electronic devices with highly varied form and functionality. For example, as shown in FIG. 2B, a user may connect a camera module, a flash memory module, a processor module, a battery module, and a touchscreen LCD or OLED module to a modular mobile electronic device to create a small and lightweight camera. The user could later add a cell-phone radio module and a microphone/speaker module to create a camera phone. Modules preferably follow an open and free standard, enabling almost anyone to be a module developer.

The flexibility afforded by module confederation preferably allows for a number of favorable outcomes. Users can purchase only the modules necessary for their needs, allowing for reductions in cost. Users can also choose to replace modules or add additional modules at a later time. In combination, these two outcomes may help increase accessibility to mobile electronic devices (and in many cases, the internet) throughout the world, especially for people for whom a smartphone or a PC is not currently a good value proposition. For example, a user may buy a system and a basic set of modules at a low price point, and transition to a more advanced phone by adding modules later on. These two outcomes may also help slow the creation of electronic waste by allowing mobile electronic devices to be upgraded or modified rather than replaced. Further, because modular mobile electronic devices are compatible with modules of highly varied form and function, and because modules are preferably based on an open standard, module confederation may allow small or specialized companies to make modules playing to their strengths without designing a full mobile electronic device.

Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD or OLED modules, non-touch graphical display modules, and e-ink display modules. Examples of power modules include battery modules, solar panel modules, and battery charging modules. The variety of modules preferably serve to provide various options and combinations of inputs, outputs, data storage, data processing, communication, power, and other suitable aspects of a computing device. Note that these example module types are in no way exhaustive or exclusive; i.e., modules may incorporate functionality from many of these example types or from none at all, and modules may additionally or alternatively incorporate suitable functionality not herein described.

Modules may feature user-replaceable module covers. Enabled by 3D printing or other processes, the appearance of the module cover (and thus, the outward appearance of the module) may be selected or even designed by module buyers.

The number of potential module designs leads to an enormous number of possible modular mobile electronic device configurations. An example modular mobile electronic device holds eight modules; two small, four medium, and two large, as shown in FIG. 1. If there are only five distinct module types for each size, the modular mobile electronic device may be uniquely configured in over 48,000 ways. If there are twenty-five distinct types of module for each size, that number rises to over 100 billion. The level of customizability enabled by modular mobile electronic devices can be extremely powerful, but choosing a configuration can be just as overwhelming.

One way to make selecting customization options for a modular mobile electronic device a more comfortable experience may be to provide opportunities for customers to configure modular mobile electronic devices in a brick-and-mortar store, where they could consult educational material, see and touch the product, and/or talk to sales representatives. As the number of available modules increases beyond a few, it may quickly become expensive and inconvenient to stock the full variety of modules available to customers. Further, if modules may feature user-designed module covers, it may also be difficult to convey how a configured device will actually appear after incorporating the user-designed module covers.

The following systems and methods address these issues by allowing users to experience tangible configuration of modular mobile electronic devices through the use of emulator modules; modules that may simulate function aspects of multiple other modules. Emulator modules potentially may be able to simulate the appearance of user-designed module covers, allowing users to better experience how various designs may appear.

The modules and/or modular mobile electronic devices of the following systems and methods are preferably those described in U.S. Provisional Application No. 61/976,173 and/or U.S. Provisional Application No. 61/976,195, which are incorporated in their entirety by this reference. The modules and modular mobile electronic devices may additionally or alternatively be any suitable modules and modular mobile electronic devices.

1. System for Tangible Configuration of a Modular Mobile Electronic Device

Figure 3:
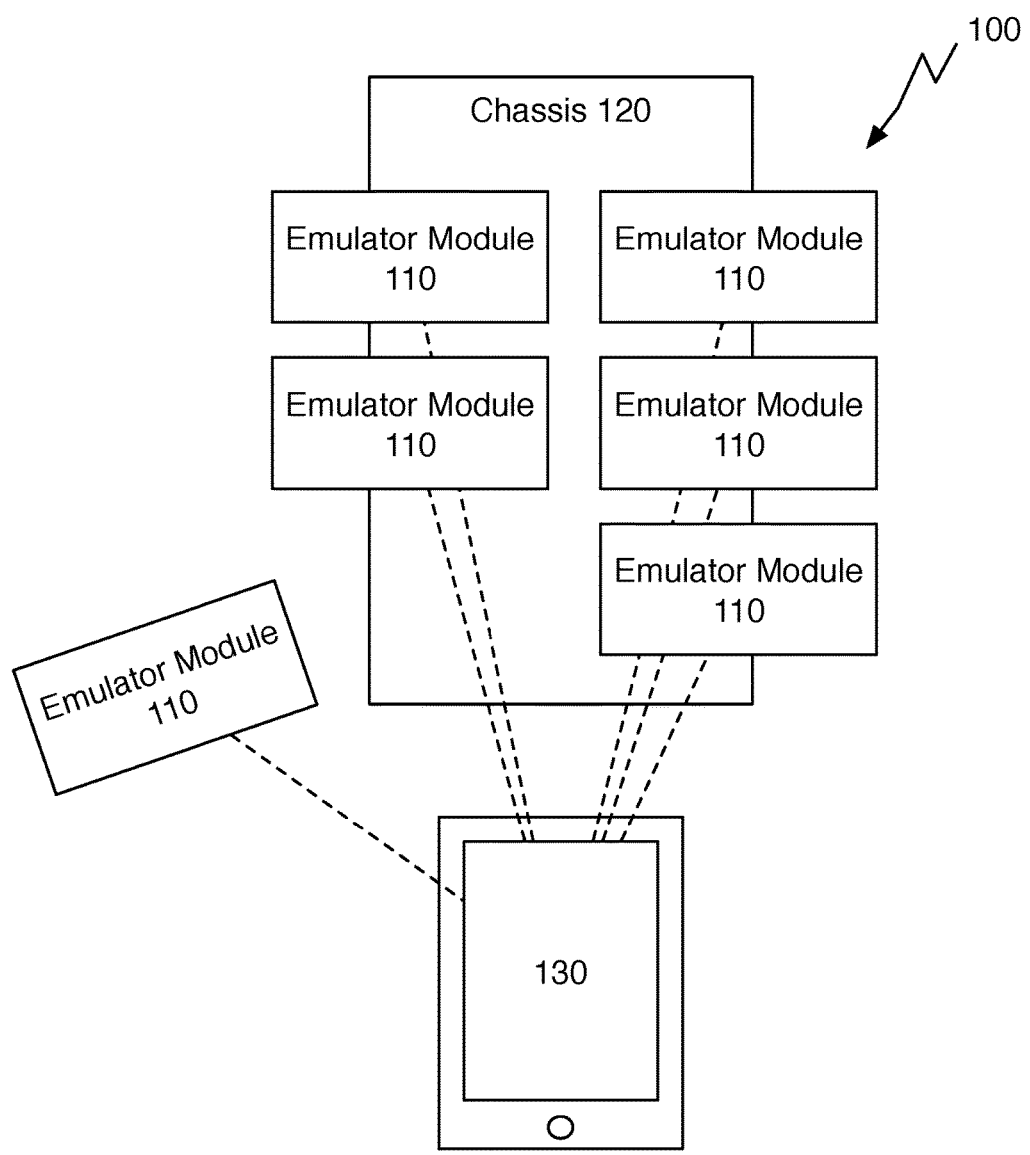
FIG. 3 is a diagram view of a system of an invention embodiment.

As shown in FIG. 3, a system 100 for tangible configuration of a modular mobile electronic device includes emulator modules 110, a chassis 120, and a module configurator 130.

Figure 4:
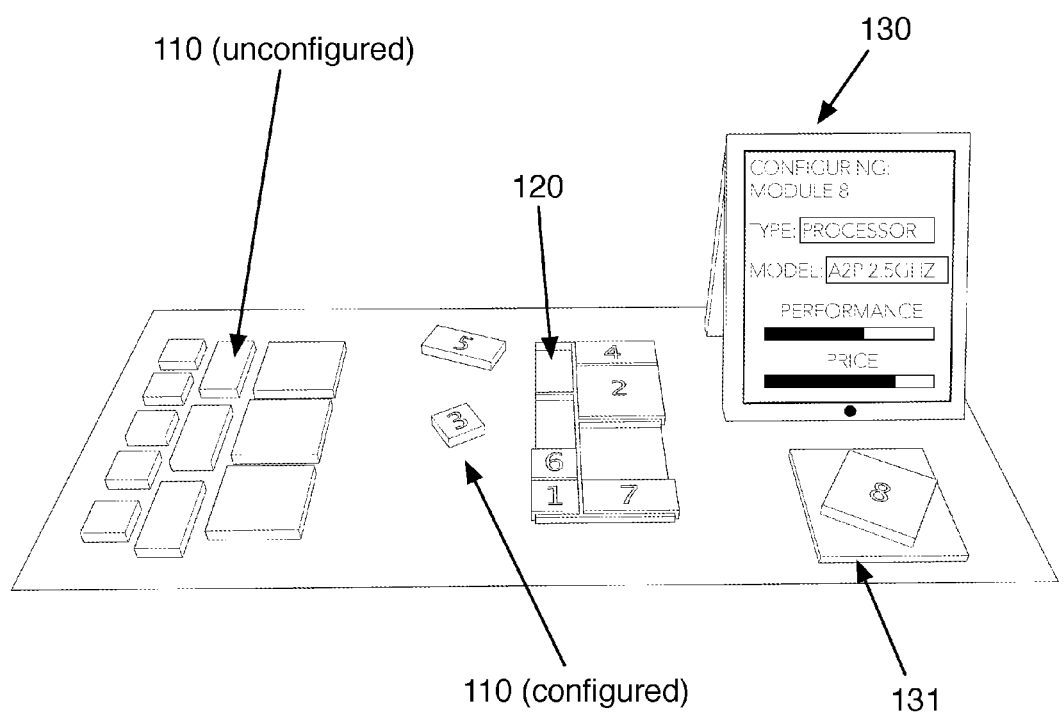
FIG. 4 is a perspective model view of an example implementation of a system of an invention embodiment.

The system 100 functions to allow customers to tangibly configure modular mobile electronic devices while emulating the experience of assembling a modular mobile electronic device from its constituent modules. The system 100 emulates this experience by enabling customers to place emulator modules 110 (or actual modules) into a chassis 120, creating a device that looks and feels like the modular mobile electronic device that customers may eventually buy. The emulator modules 110 are preferably configurable to represent any of a subset of available modules (e.g., a small sized emulator module may be able to represent any other small sized emulator module). The emulator modules 110 are preferably configured using the module configurator 130, but may additionally or alternatively be configured by the emulator modules 110 themselves or by any other suitable system. An example implementation of the system 100 is as shown in FIG. 4.

The emulator modules 110 function to represent modules for purposes of configuring a modular mobile electronic device. The emulator modules 110 are preferably substantially the same size and shape as modules meant to be used as part of a modular mobile electronic device (hereafter "full modules"), but may additionally or alternatively be any suitable size and shape (e.g. emulator modules may be to scale, but not to size). The emulator modules 110 preferably are linked to emulation profiles and display profiles, but may additionally or alternatively be linked to only one or neither of emulation profiles and display profiles. Emulation profiles function to define the type of full module an emulator module 110 should emulate; for example, an emulator module 110 may be linked to an emulation profile for a particular processor module. Emulation profiles preferably include information about full modules to allow emulator modules to represent those full modules. Emulation profiles may include information like module type (e.g. processor, memory, battery, etc.), module specifications (e.g. battery capacity, memory capacity, processor speed), module price, module performance ratings (e.g. a processing speed score from 1-10 for a processor module) and/or any other relevant information. Display profiles function to define the appearance of a module (e.g., the module cover) that an emulator module display should emulate.

The emulator modules 110 preferably couple mechanically to the chassis 120 in a manner substantially similar to the manner in which full modules couple mechanically to a modular mobile electronic device. Additionally or alternatively, the emulator modules 110 may couple mechanically to the chassis 120 in any manner. The emulator modules 110 may additionally couple electrically to the chassis 120 for purposes of power and/or data transfer through the chassis 120 and/or with other emulator modules 110. Alternatively, the emulator modules 110 may lack either or both of wired data and power connections to the chassis 120.

The emulator modules 110 preferably include displays. The display functions to allow the emulator module to mimic the appearance of user-created or selected module cover designs (or any other aspect of module appearance), allowing customers to try out different module cover styles during modular mobile electronic device configuration. The display preferably displays an image, color, and/or pattern based on a display profile linked to the emulator module 110. The display is preferably an LCD display, but may additionally or alternatively be an OLED display, an e-ink display, and/or any suitable type of display. The display may additionally be touch sensitive. The display preferably covers the top surface of the emulator module 110, but additionally or alternatively may cover only a part of the top surface or may be located on any other surface of the emulator module 110. The display may additionally or alternatively function to allow for customer control of the emulator module (e.g., allowing a user to switch between display profiles, or allowing a user to associate an emulator module 110 with a different emulation profile). As another example, the display may allow customers to switch between information panels describing the module emulation profiles (or any other information pertaining to the emulated modular mobile electronic device).

The emulator module 110 preferably includes a wireless radio (e.g. Wi-Fi, NFC, RFID, Bluetooth, BLE, etc.) to allow it to communicate with other emulator modules 110, the chassis 120, and/or the module configurator 130. The emulator module 110 may additionally or alternatively communicate using any other suitable communication means; for example, the emulator module 110 may communicate with other emulator modules 110 through wires or optical fibers in the chassis 120. Further, if the chassis 120 includes a wireless radio, the emulator module 110 may be able to communicate using that wireless radio when coupled to the chassis 120.

The emulator module 110 preferably includes a processor to control wireless (or wired) communication and the display. The emulator module 110 preferably includes a battery to power the emulator module 110, but may additionally or alternatively draw power from the chassis 120 or from any suitable source.

The emulator module 110 may additionally or alternatively include position sensors. Position sensors function to determine the position of the emulator module 110 relative to the chassis 120 or relative to any other suitable reference. For example, position sensors might be used to detect that a module is positioned in an upper right corner of the chassis 120. Position sensors might include accelerometers, gyroscopes, proximity sensors, or any other suitable position sensors.

In a variation of the invention, the emulator module 110 includes a position code detection system. The position code detection system senses a code on or in the chassis 120 when the emulator module 110 is coupled to the chassis 120. This code may be encoded and/or sensed in a number of ways. For example, the chassis 120 may include a series of pins that contact corresponding pads on the bottom of emulator modules 110; each module slot in the chassis 120 has a unique pin arrangement, so when an emulator module 110 is coupled, the position is known by sensing which pins are contacting the emulator module. As another example, the chassis 120 includes RFID tags and the emulator module 110 includes an RFID reader; the RFID tag for each module slot in the chassis is unique, again allowing for position detection. As a third example, each module slot in the chassis 120 has a connection with a unique characteristic impedance; the emulator module 110 may detect the module slot by measuring that unique characteristic impedance.

The chassis 120 functions to mechanically couple to emulator modules 110, allowing the chassis and emulator module system to look and feel like a modular mobile electronic device. The chassis 120 is preferably substantially similar to a chassis meant for a modular mobile electronic device, but may additionally or alternatively be any structure capable of mechanically coupling to emulator modules 110. The chassis 120 is preferably formed of a rigid material, and is more preferably formed of metal to ensure structural stability, but may additionally or alternatively be made of any suitable materials.

The chassis 120 may include position encoding, as previously described, to allow an emulator module 110 to detect which slot of the chassis 120 the emulator module 120 is coupled to.

In a variation of the invention, the chassis 120 includes a module communication network and/or a module power network. The module communication network functions to allow emulator modules 110 to communicate with each other through the chassis 120 (e.g. by connecting modules to each other via a network switch). The module communication network may additionally or alternatively function to allow emulator modules 110 to communicate with other sources. For example, the module communication network may include a wireless radio to allow emulator modules 110 to communicate with a module configurator 130. The module power network functions to provide power to emulator modules 110 through the chassis 120. The module power network preferably includes a battery, but additionally or alternatively receive power from any other suitable source (e.g. a wall plug, wireless charging sources).

The module configurator 130 functions to associate emulator modules 110 with emulation profiles. The module configurator 130 may additionally or alternatively function to associate emulator modules 110 with display profiles.

Emulation profiles preferably include information about full modules to allow emulator modules 110 to represent those full modules. Emulation profiles may include information like module type (e.g. processor, memory, battery, etc.), module specifications (e.g. battery capacity, memory capacity, processor speed), module price, module performance ratings (e.g. a processing speed score from 1-10 for a processor module) and/or any other relevant information.

Emulation profiles may include performance metrics; e.g., power consumption metrics for power-consuming modules, power storage metrics for battery modules, and/or processing metrics for processor modules. Performance metrics may be general performance metrics (as in some of the previous examples) or function-specific performance metrics. For example, a function-specific performance metric might describe how well a processor handles a certain type of gaming application.

Display profiles preferably include design information to allow emulator modules 110 to emulate the appearance of full modules. Display profiles may include information like module cover pattern, color, materials, and/or any other relevant design information.

The module configurator 130 preferably is implemented in software on a computing device (e.g. a laptop, a tablet, a smartphone) separate from the emulator modules 110 and the chassis 120, but may additionally or alternatively be run in whole or in part on emulator modules 110 and/or the chassis 120. For example, the module configurator 130 may be run using processor capability stored in the chassis 120 and displayed on a display coupled to the chassis 120.

The module configurator 130 preferably communicates with emulator modules 110 in real-time over a wireless radio, but may additionally or alternatively communicate with emulator modules in any suitable way.

Figure 5:
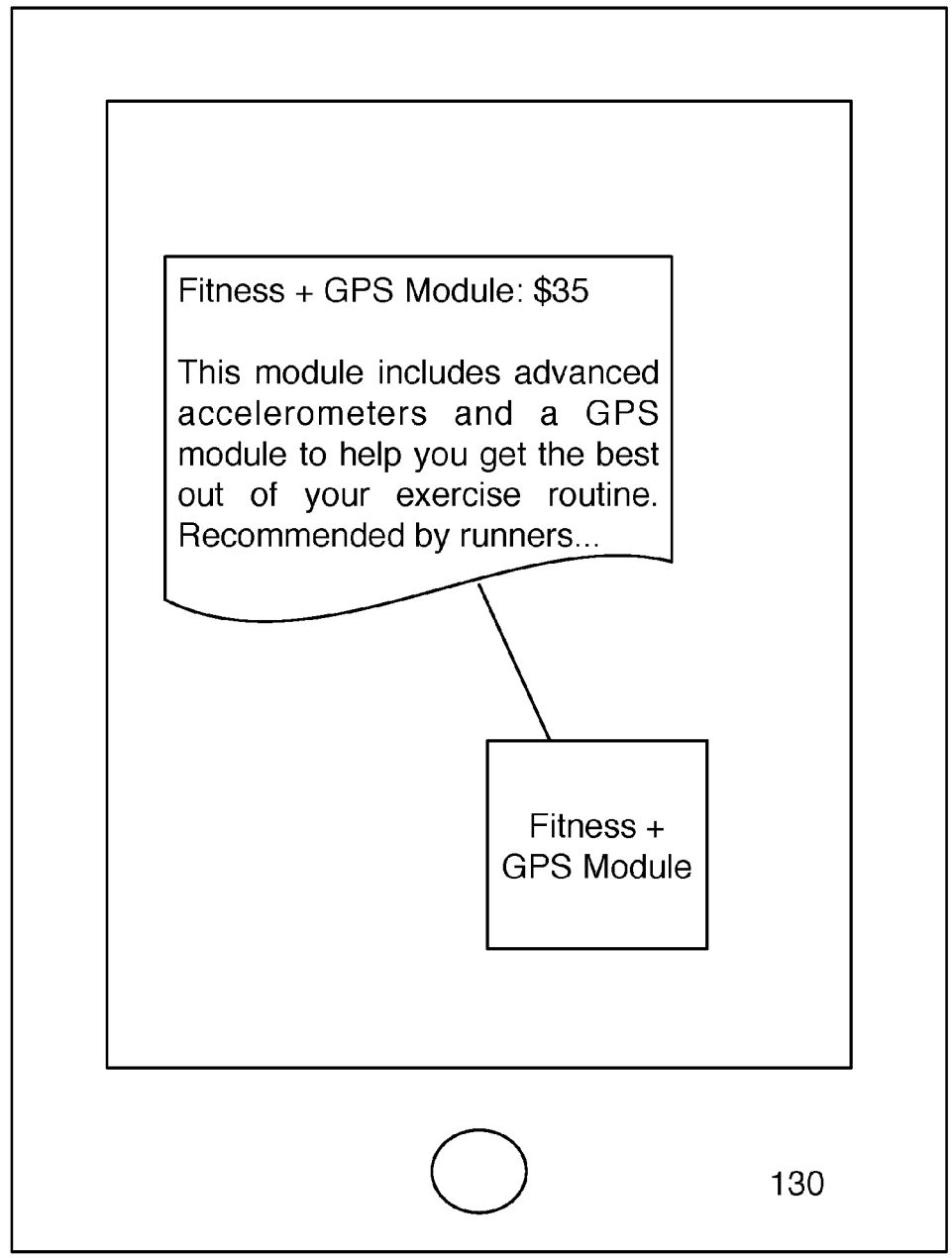
FIG. 5 is an example image view of an emulation profile selector of a module configurator of a system of an invention embodiment.

As shown in FIG. 5, the module configurator 130 preferably includes a database of emulation profiles to allow customers to manually select an emulation profile to apply to an emulator module 110. The module configurator 130 may additionally or alternatively include a recommendation engine. The recommendation engine functions to recommend emulation profiles to customers based on criteria such as intended function (e.g. the engine might ask a customer how he/she would use the device), other emulation profiles selected (e.g. if the customer selects an emulation profile corresponding to an HD video camera module, the engine might suggest an emulation profile corresponding to a high-powered processor module), price range, and/or any other suitable criteria.

Figure 6:
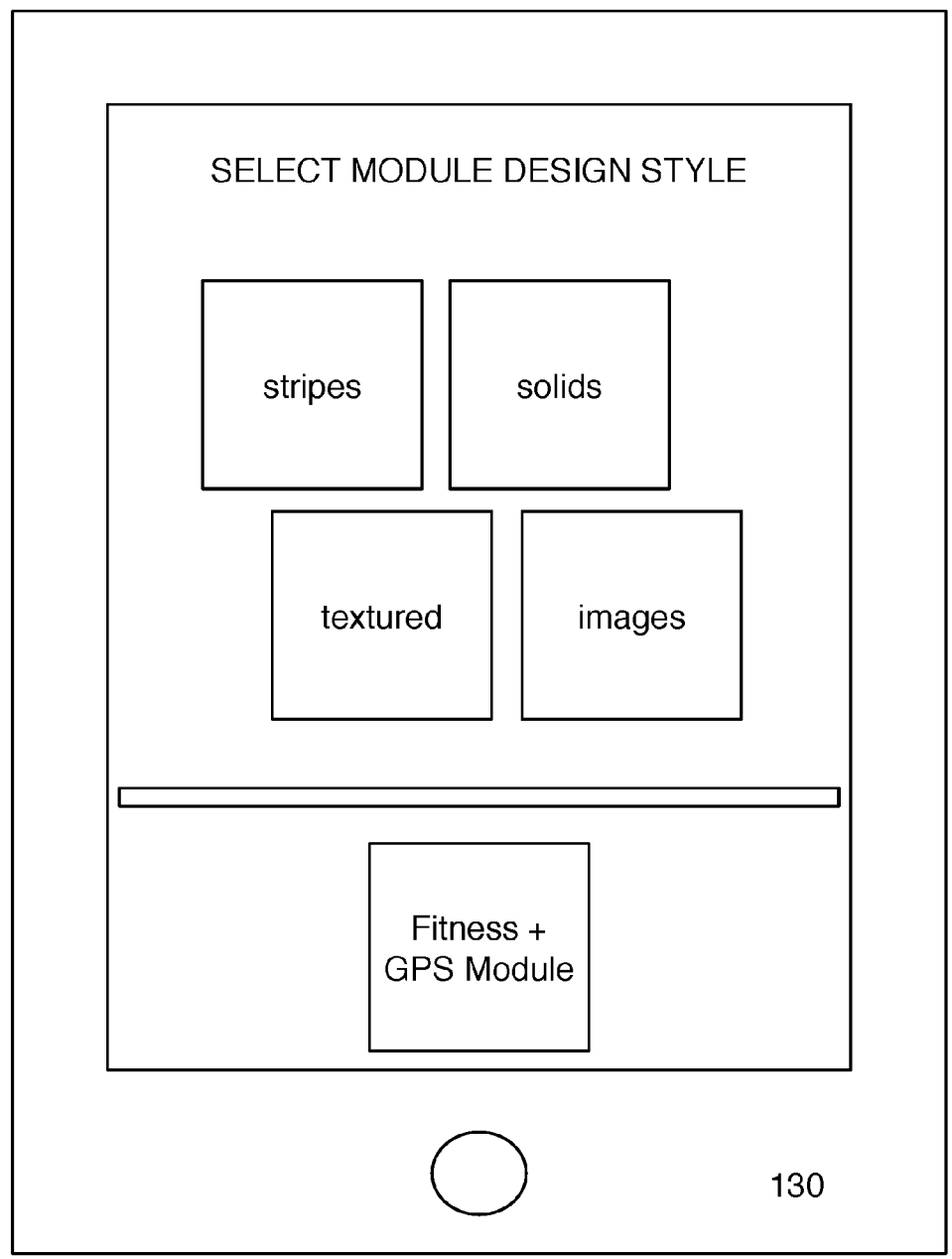
FIG. 6 is an example image view of a display profile selector of a module configurator of a system of an invention embodiment.

The module configurator 130 preferably also includes a database of display profiles to allow customers to select a display profile to apply to one or more emulator modules 110. The module configurator 130 may additionally or alternatively include a display profile configurator, as shown in FIG. 6. The display profile configurator functions to allow customers to design a display profile based on customer-selected or designed colors, patterns, or images. For example, a customer may upload an image to the module configurator 130, which generates a pattern based on that image.

The module configurator 130 preferably applies display and emulation profiles by transmitting them wirelessly to emulator modules 110, but may additionally or alternatively apply display and emulation profiles in any suitable manner. The module configurator 130 may additionally or alternatively be associated with a configuration area 131. The configuration area 131 is an area that emulator modules 110 may be placed to select them for configuration (additionally or alternatively, emulator modules 110 may be configured at any time by selecting them manually in the module configurator 130. When an emulator module 110 is placed in the configuration area, the module configurator 130 preferably launches a configuration utility for that emulator module 110, allowing a customer to select display and/or emulation profiles.

The configuration area 131 may simply be a two or three-dimensional area in space that emulator modules 110 may be placed in (detection being performed via a type of geofencing); additionally or alternatively, the configuration area 131 may include a wired interface (e.g., a module slot, a cable that plugs into the emulator module) or a wireless interface (e.g., an inductive data transmission interface) for transmitting data between the module configurator 130 and the emulator modules 110. In these instances, detection of connection or data transfer to the interface in the configuration area 131 may serve as an indicator of emulator module 110 location within the configuration area.

Figure 7:
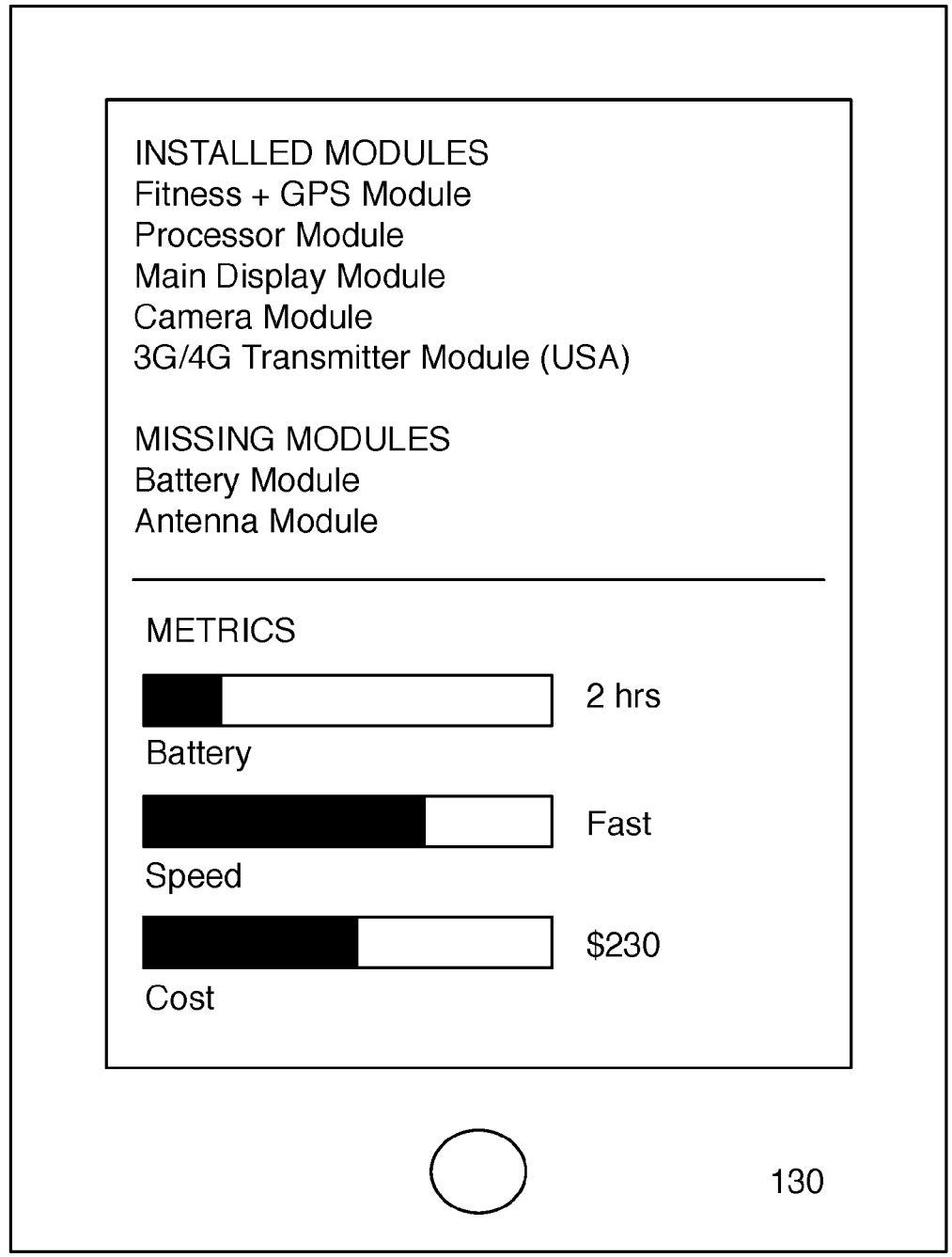
FIG. 7 is an example image view of a system overview generator of a module configurator of a system of an invention embodiment.

The module configurator 130 preferably includes a system overview generator, as shown in FIG. 7. The system overview generator functions to show a customer an overview of the modular mobile electronic device emulated by the emulator modules 110. The system overview generator may include information like device cost, device benchmark ratings (e.g. processing capability, battery capacity, etc.), suggested device uses, suggested additional modules, and/or any other suitable information relating to the emulated system. The system overview generator may also generate system-level performance metrics from a combination of emulator module data (e.g., a synthesis of processor metrics, display metrics, storage metrics, etc.). These system-level performance metrics may be general or function-specific (e.g., describing how well an emulated system may perform for photography or gaming).

2. Method for Tangible Configuration of a Modular Mobile Electronic Device

Figure 8:
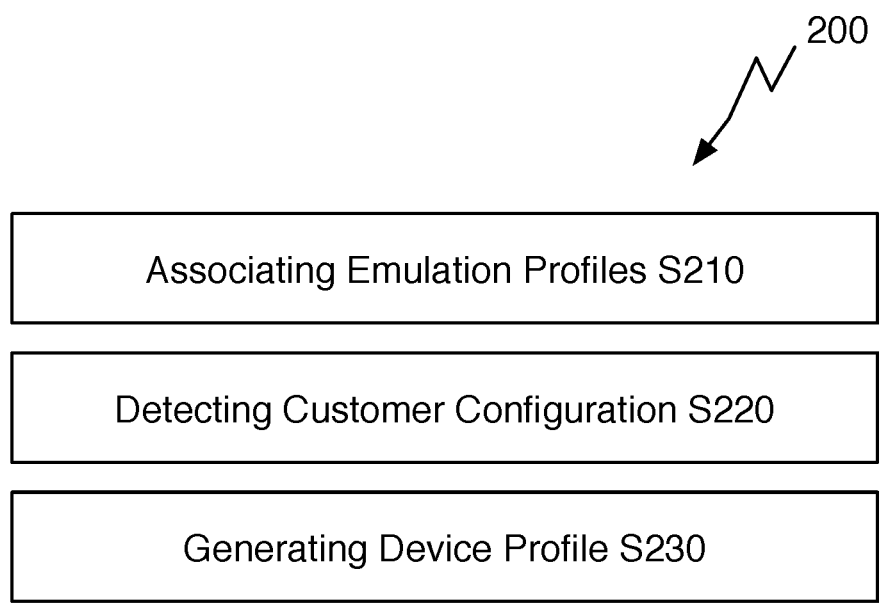
FIG. 8 is chart view of a method of an invention embodiment.

As shown in FIG. 8, a method 200 for tangible configuration of a modular mobile electronic device includes associating emulator modules with emulation profiles S210, detecting a customer configuration of emulator modules S220, and generating a device profile from the detected customer configuration S230.

The method 200 functions to enable customers to tangibly configure modular mobile electronic devices while emulating the experience of assembling a modular mobile electronic device from its constituent modules. The method 200 emulates this experience by allowing customers to associate emulator modules with emulation and/or display profiles and place those emulator modules into a chassis, creating a device that looks and feels like the modular mobile electronic device that customers may eventually buy. Once customers have placed emulator modules into a chassis, the configuration of the modules is detected, and a device profile is generated. The customer may reconfigure the emulator modules as often as desired to receive different device profiles and compare configurations and visual styles. Once the customer has settled on a device profile, the customer preferably may save the device profile or order a device designed using the selected device profile.

Step S210 includes associating emulator modules with emulation profiles. Step S210 functions to allow customers to configure emulator modules to represent full modules for purposes of configuring a modular mobile electronic device. The emulator modules of Step S210 are preferably substantially similar to those of the system 100, but may additionally or alternatively be any devices capable of representing modules in function and/or appearance. Step S210 preferably includes linking each of the emulator modules to an emulation profile, but may additionally or alternatively include linking each of the emulator modules to a display profile.

Emulation profiles function to define the type of module an emulator module should emulate; for example, an emulator module may be linked to an emulation profile for a particular processor module. Emulation profiles preferably include information about full modules to allow emulator modules to represent those full modules. Emulation profiles may include information like module type (e.g. processor, memory, battery, etc.), module specifications (e.g. battery capacity, memory capacity, processor speed), module price, module performance ratings (e.g. a processing speed score from 1-10 for a processor module) and/or any other relevant information.

Display profiles function to define the appearance of a module cover that an emulator module display should emulate. Display profiles preferably include design information to allow emulator modules to emulate the appearance of full modules. Display profiles may include information like module cover pattern, color, materials, and/or any other relevant design information.

Step S210 preferably includes manually linking emulator modules with emulation and/or display profiles based on customer input, but may additionally or alternatively include linking emulator modules with emulation and/or display profiles based on recommendation engine suggestions and/or display profile configurator results, as described in the system 100 description.

Step S210 preferably includes applying display and emulation profiles by transmitting them wirelessly to emulator modules, but may additionally or alternatively apply display and emulation profiles in any suitable manner.

Step S220 includes detecting a customer configuration of emulator modules. Step S220 functions to determine which emulator modules are placed in a chassis and how they are oriented. Step S220 may include receiving information from emulator module position sensors to determine the position of the emulator modules relative to the chassis or relative to any other suitable reference, receiving information from a position code detection system of the emulator modules and/or the chassis, receiving information from a customer (e.g. the customer inputs which emulator modules are in which positions of the chassis), or receiving information regarding customer configuration from any suitable source.

Step S230 includes generating a device profile from the detected customer configuration. Step S230 functions to provide a customer information about the modular mobile electronic device emulated by the emulator modules and chassis. The device profile may include information like device cost, device benchmark ratings (e.g. processing capability, battery capacity, etc.), suggested device uses, suggested additional modules, and/or any other suitable information relating to the emulated system.

Step S230 may additionally or alternatively include comparing the device profile to other device profiles; for instance, a customer may compare a created display profile to suggested device profiles, to device profiles of the user's friends, and/or to device profiles of celebrities, etc.

Step S230 may additionally include storing the device profile, sending the device profile to the customer, and/or sending the device profile to a manufacturer or supplier to allow the customer's emulated device to be created and delivered (e.g. through shipping or another suitable fulfillment process) to the customer.

An alternative embodiment preferably implements the above methods in a computer-readable medium storing computer-readable instructions. The instructions are preferably executed by computer-executable components preferably integrated with a system for tangible configuration of a modular mobile electronic device. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the embodiments of the invention without departing from the scope of this invention defined in the following claims.

What is claimed is:

1. A system for tangible configuration of a modular mobile electronic device comprising:
   a set of emulator modules, each comprising a processor and configurable to represent any of a set of full modules available for use with the modular mobile electronic device;
   a chassis that mechanically couples to at least one of the set of emulator modules; and
   a module configurator that associates each of the set of emulator modules with an emulation profile, wherein the module configurator comprises a database of emulation profiles and a recommendation engine that recommends emulation profiles based on at least one of a desired function and emulation profiles currently linked to the emulation modules.

2. The system of claim 1, wherein each of the set of emulator modules further comprises a display; wherein the module configurator further associates each of the set of emulator modules with a display profile, wherein the display profile includes at least one of module cover pattern, module cover color, and module cover material information.

3. The system of claim 2, wherein the display of each of the set of emulator modules is a touchscreen display, and the display enables user control of emulator module properties.

4. The system of claim 3, wherein the set of full modules available for use with the modular mobile electronic device includes at least a processor module, a camera module, and a communication module.

5. The system of claim 1, wherein the emulation profiles include module type information and module performance information.

6. The system of claim 5, wherein module performance information comprises function-specific performance metrics.

7. The system of claim 1, wherein each of the set of emulator modules comprises a position sensor; wherein the module configurator associates the emulator modules of the set of emulator modules with the emulation profiles according to position data detected by the position sensor.

8. The system of claim 7, wherein the chassis comprises a set of position codes; each of the set of position codes located within a module slot of the chassis; wherein position sensors detect emulator module position according to the set of position codes.

9. The system of claim 8, wherein the position codes are encoded by RFID tags; wherein the position sensors detect the emulator module position by reading the RFID tags.

10. The system of claim 8, wherein the position codes are encoded by contacts having unique characteristic impedances; wherein the position sensors detect emulator module position by detecting the characteristic impedances.

11. The system of claim 1, further comprising a system overview generator that displays an overview of a modular mobile electronic device emulated by the set of emulator modules.

12. The system of claim 1, further comprising a configuration area associated with the module configurator; wherein the emulator modules are linked with emulation profiles in the module configurator.

13. The system of claim 12, wherein the configuration area comprises an emulator module data connection interface.

14. A method for tangible configuration of a modular mobile electronic device comprising:
   associating emulator modules with emulation profiles, wherein the emulation profiles include module type information and module performance information;
   detecting a configuration of the emulator modules after the emulator modules have been coupled to a mechanical coupling device; and
   generating a device profile based on the configuration.

15. The method of claim 14, further comprising associating the emulator modules with display profiles.

16. The method of claim 14, wherein associating the emulator modules with the emulation profiles comprises associating the emulator modules with the emulation profiles based on user input.

17. The method of claim 14, wherein associating the emulator modules with the emulation profiles comprises associating the emulator modules with the emulation profiles based on an output of a recommendation engine.

18. The method of claim 14, wherein detecting a configuration of the emulator modules comprises detecting the configuration based on data from one or more emulator module position sensors.

19. The method of claim 14, wherein generating a device profile further comprises comparing the device profile to another device profile.

20. The method of claim 14, further comprising sending the device profile to a supplier to facilitate the creation of a modular mobile electronic device based on the device profile.

* * * * *